US011565715B2

(12) United States Patent
Bansal et al.

(10) Patent No.: US 11,565,715 B2
(45) Date of Patent: Jan. 31, 2023

(54) NEURAL NETWORKS WITH ATTENTION AL BOTTLENECKS FOR TRAJECTORY PLANNING

(71) Applicant: Waymo LLC, Mountain View, CA (US)

(72) Inventors: Mayank Bansal, Mountain View, CA (US); Jinkyu Kim, Albany, CA (US)

(73) Assignee: Waymo LLC, Mountain View, CA (US)

( * ) Notice: Subject to any disclaimer, the term of this patent is extended or adjusted under 35 U.S.C. 154(b) by 27 days.

(21) Appl. No.: 17/020,399

(22) Filed: Sep. 14, 2020

(65) Prior Publication Data

US 2021/0078594 A1 Mar. 18, 2021

Related U.S. Application Data

(60) Provisional application No. 62/900,402, filed on Sep. 13, 2019.

(51) Int. Cl.
*B60W 60/00* (2020.01)
*G06K 9/00* (2022.01)
(Continued)

(52) U.S. Cl.
CPC .......... *B60W 60/001* (2020.02); *G01C 21/30* (2013.01); *G01C 21/3407* (2013.01);
(Continued)

(58) Field of Classification Search
CPC ............ B60W 60/001; B60W 2555/60; G01C 21/3815; G01C 21/30; G01C 21/3407;
(Continued)

(56) References Cited

U.S. PATENT DOCUMENTS

2019/0179328 A1* 6/2019 Movert ............... G06F 16/9537
2019/0383904 A1* 12/2019 Harrison .............. G01S 13/867
(Continued)

OTHER PUBLICATIONS

Alemi et al., "Deep variational information bottleneck," CoRR, Dec. 2016. arxiv.org/abs/1612,00410, 19 pages.
(Continued)

*Primary Examiner* — Faris S Almatrahi
*Assistant Examiner* — Sahar Motazedi
(74) *Attorney, Agent, or Firm* — Fish & Richardson P.C.

(57) ABSTRACT

Methods, systems, and apparatus, including computer programs encoded on computer storage media, for planning a trajectory of a vehicle. One of the methods includes obtaining input data for planning a driving trajectory for a vehicle, the input data comprising an intended route for the vehicle and data characterizing an environment in a vicinity of the vehicle; processing the input data using an input encoder neural network to generate feature data that includes a respective feature representation for each of a plurality of locations in the environment; applying spatial attention to the feature representations to generate a respective attention weight for each of the plurality of locations; generating a respective attended feature representation for each of the plurality of locations; generating a bottlenecked representation of the attended feature representations; and generating a planned future trajectory from at least the bottlenecked representation.

17 Claims, 6 Drawing Sheets

(51) Int. Cl.
*G06K 9/62* (2022.01)
*G01C 21/34* (2006.01)
*G01C 21/36* (2006.01)
*G01C 21/30* (2006.01)
*G01C 21/00* (2006.01)
*G06V 20/58* (2022.01)

(52) U.S. Cl.
CPC ..... *G01C 21/3626* (2013.01); *G01C 21/3691* (2013.01); *G01C 21/3815* (2020.08); *G06K 9/6232* (2013.01); *G06V 20/584* (2022.01); *B60W 2555/60* (2020.02)

(58) Field of Classification Search
CPC ............ G01C 21/3626; G01C 21/3691; G06V 20/584; G06K 9/6232; B23K 31/006; B60G 2600/1878; B29C 2945/76979; B60T 2210/122; B65H 2557/38
See application file for complete search history.

(56) References Cited

U.S. PATENT DOCUMENTS

2020/0086863 A1* 3/2020 Rosman ............ B60W 30/0956
2020/0160151 A1* 5/2020 Urtasun ............... G06V 10/454
2020/0202128 A1* 6/2020 Liu .................... H04N 5/23245

OTHER PUBLICATIONS

Bansal et al., “ChauffeurNet: Learning to Drive bv Imitating the Best and Synthesizing the Worst,” CoRR, Dec. 2018, arXiv: 1812. 03079, 20 pages.
Bojarski et al., “VisualBackProp: efficient visualization of CNNs.” CoRR, Nov. 2016. arxiv.org/abs/1611.05418, 19 pages.
Chalk et al., “Relevant sparse codes with variational information bottleneck,” Advances in Neural Information Processing Systems 29, 9 pages.
Goval et al., “Infobot: Transfer and exploration via the information bottleneck,” CoRR, Jan. 2019, arxiv.org/abs/1901.10902, 21 pages.
Gunning et al., “Explainable artificial intelligence,” DARPA, Nov. 2017, 18 pages.
Kim et al., “Attentional Bottleneck: Towards an Interpretable Deep Driving Network.” Proceedings of the IEEE/CVF Conference on Computer Vision and Pattern Recognition, 2020, pp. 322-323.
Kim et al., “Interpretable learning for self-driving cars bv visualizing causal attention,” Proceedings of the IEEE International Conference on Computer Vision, 2017, pp. 2942-2950.
Selvaraju et al., “Grad-CAM: Visual explanations from deep networks via gradient-based localization,” Proceedings of the IEEE International Conference on Computer Vision, 2017, pp. 618-626.
Tishby et al., “The information bottleneck method,” CoRR, Apr. 2000, arxiv.org/abs/physics/0004057, 16 pages.
Wang et al., “Deep object centric policies for autonomous driving,” 2019 International Conference on Robotics and Automation, May 2019, 7 pages.
Xu et al., “Show, attend and tell: Neural image caption generation with visual attention,” Proceedings of the 32 nd International Conference on Machine Learning, 2015, 10 pages.
Zeiler et al., “Visualizing and understanding convolutional networks,” European Conference on Computer Vision, 2014, pp. 818-833.
Zeng et al., “End-to-end interpretable neural motion planner,” Proceedings of the IEEE/CVF Conference on Computer Vision and Pattern Recognition, 2019, pp. 8660-8669.
Zhou et al., “Learning deep features for discriminative localization,” Proceedings of the IEEE Conference on Computer Vision and Pattern Recognitions, 2016, pp. 2921-2929.

* cited by examiner

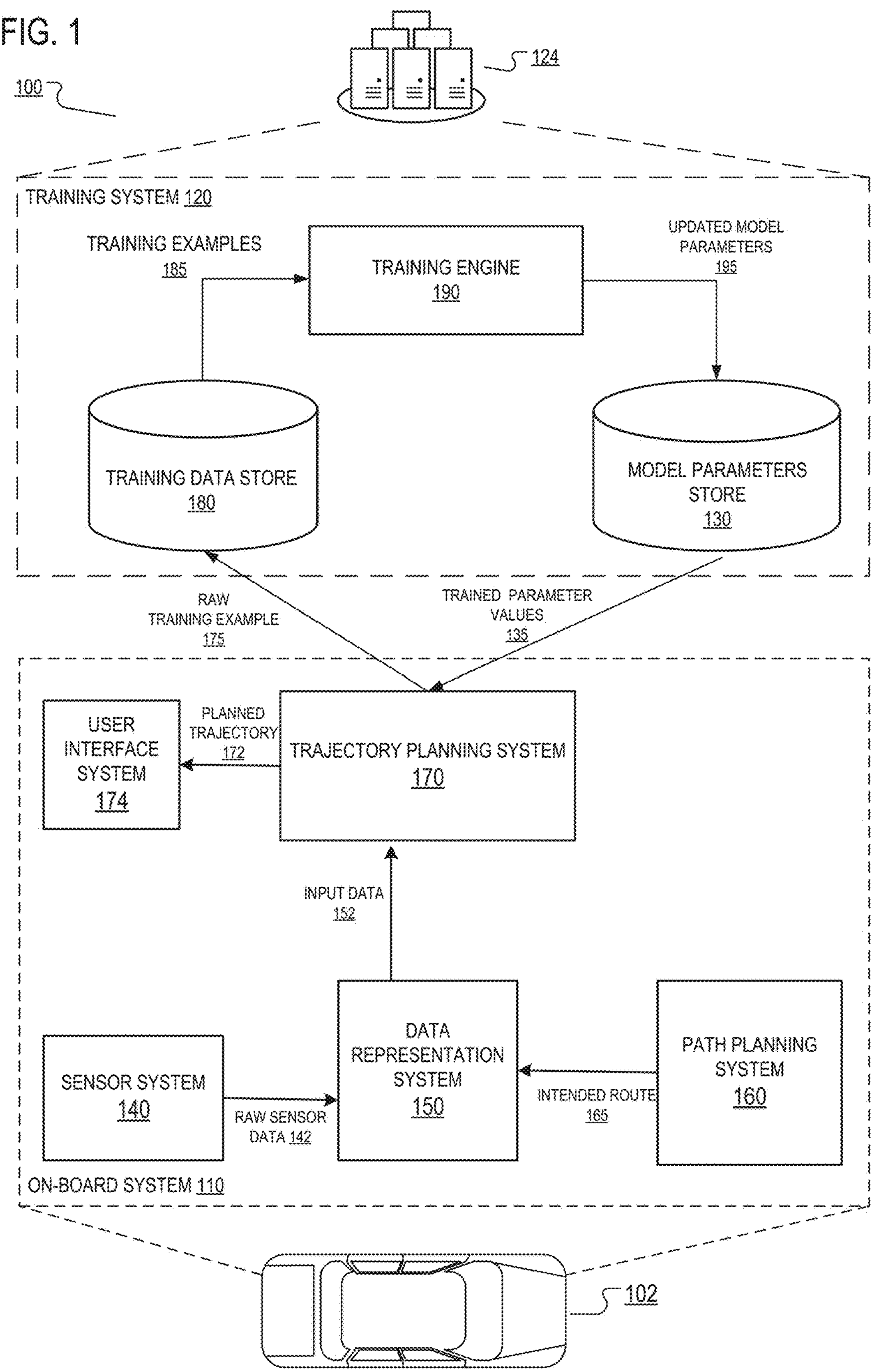
FIG. 1
124
100
TRAINING SYSTEM 120
TRAINING EXAMPLES 185
TRAINING ENGINE 190
UPDATED MODEL PARAMETERS 195
TRAINING DATA STORE 180
MODEL PARAMETERS STORE 130
RAW TRAINING EXAMPLE 175
TRAINED PARAMETER VALUES 135
USER INTERFACE SYSTEM 174
PLANNED TRAJECTORY 172
TRAJECTORY PLANNING SYSTEM 170
INPUT DATA 152
SENSOR SYSTEM 140
RAW SENSOR DATA 142
DATA REPRESENTATION SYSTEM 150
INTENDED ROUTE 165
PATH PLANNING SYSTEM 160
ON-BOARD SYSTEM 110
102

500

A
w
h
d
(wxhx1)
Softmax
(wxhx1)
1x1 conv
(wxhxd)
1x1 conv
concatenation
w
h
d
d
d
(wxhxd)
3x3 conv
(wxhxd)
3x3 conv
(wxhxd)
1x1 conv
Rate=2
Rate=4
LAYER 610
F
d
h
w
600

NEURAL NETWORKS WITH ATTENTIONAL BOTTLENECKS FOR TRAJECTORY PLANNING

CROSS-REFERENCE TO RELATED APPLICATION

This application claims priority to U.S. provisional application No. 62/900,402, filed on Sep. 13, 2019. The disclosure of the prior application is considered part of and is incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes how a vehicle, e.g., an autonomous or semi-autonomous vehicle, can plan a future driving trajectory for a vehicle based on an intended plan for the vehicle and data characterizing an environment in the vicinity of the vehicle.

Once the future driving trajectory of the vehicle has been generated, an on-board system of the vehicle can use the planned future driving trajectory to make autonomous or semi-autonomous driving decisions.

Particular embodiments of the subject matter described in this specification can be implemented so as to realize one or more of the following advantages.

Deep neural networks are a key component of behavior prediction and motion generation for autonomous vehicles. However, one of the main drawbacks of using deep neural networks is a lack of transparency: conventional deep neural networks do not provide easy to interpret rationales for what triggers certain behaviors. The described techniques on the other hand use an attentional bottleneck to improve transparency without sacrificing (and in some cases even improving) prediction accuracy relative to conventional approaches. In particular, the described techniques combine visual spatial attention, which identifies what aspects of the input the model is using, with an information bottleneck that causes the model to only use aspects of the input which are important. This not only provides sparse and interpretable attention maps (e.g. focusing only on specific vehicles in the scene), but it adds this transparency at no cost to model accuracy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a diagram of an example system.

Like reference numbers and designations in the various drawings indicate like elements.

DETAILED DESCRIPTION

Figure 2:
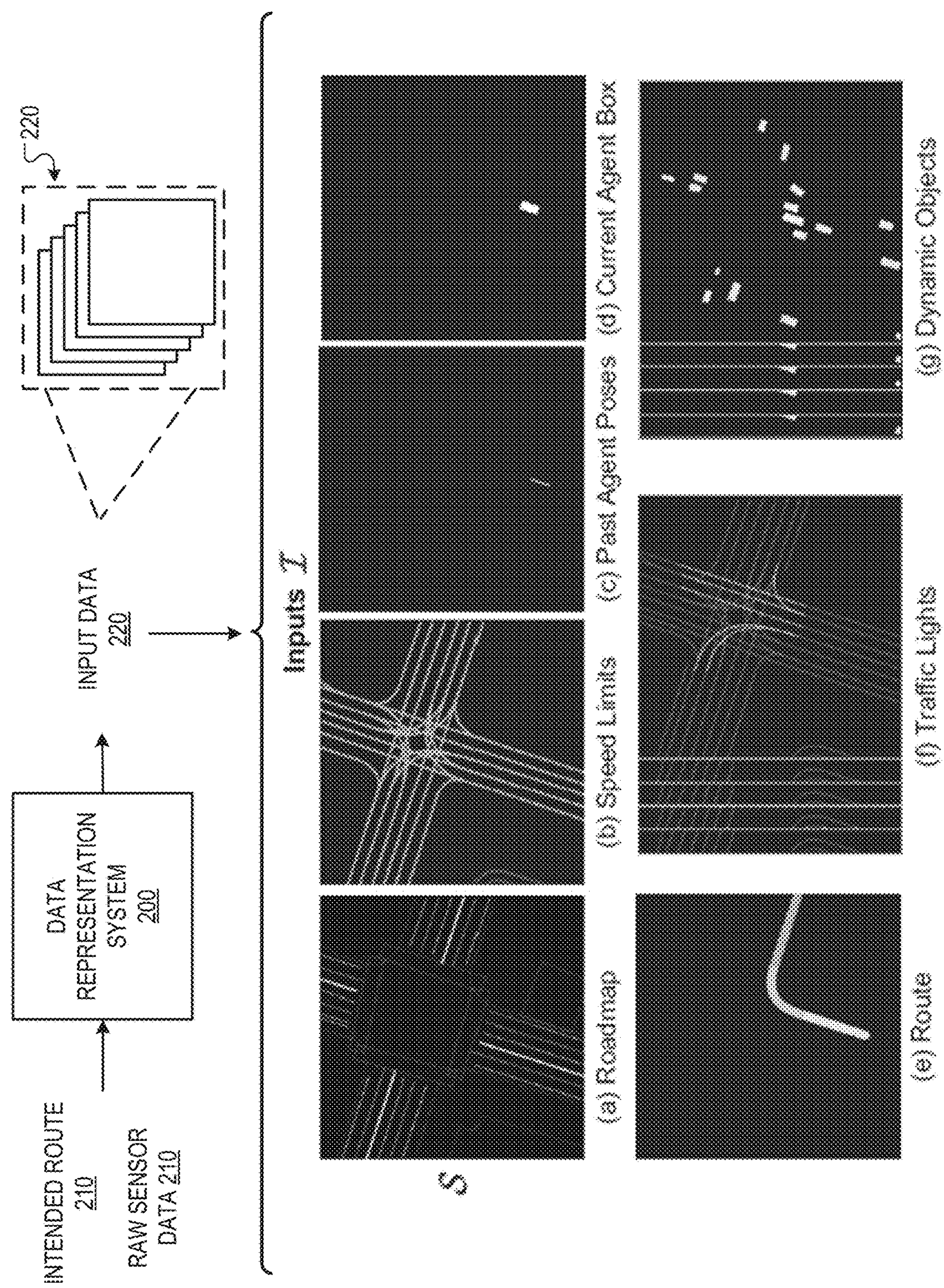
FIG. 2 is a block diagram of an example data representation system for generating input data.

This specification describes how a vehicle, e.g., an autonomous or semi-autonomous vehicle, can use a trained machine learning model to generate a planned future trajectory for the vehicle.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle. The on-board system 110 includes one or more sensor subsystems 140. The sensor subsystems 140 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 140 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 140 classify one or more groups of raw sensor measurements as being measures of respective other agents, the sensor subsystems 140 can compile the raw sensor measurements into a set of raw data 142, and send the raw data 142 to a data representation system 150.

The on-board system 110 also includes a path planning system 160. The path planning system 160 obtains or generates intended route data 165 that characterizes an intended route that the vehicle 102 will take in the future. For example, a user or other operator can submit a destination for the navigation of the vehicle 102 and the path planning system 160 can generate an intended route that traverses a road graph to arrive at the destination from the current location of the vehicle. The path planning system 160 sends the intended route data 165 to the data representation system 150.

The data representation system 150, also on-board the vehicle 102, receives the raw sensor data 142 from the sensor system 140, the intended route data 165, and optionally additional data and generates input data 152 that characterizes the environment in the vicinity of the vehicle 102. An example data representation system 150 and input data 152 are described in more detail below in reference to FIG. 2.

The data representation system 150 provides the input data 152 and the vehicle trajectory data 154 to a trajectory planning system 170, also on-board the vehicle 102. The trajectory planning system 170 uses the input data and one or more trained deep neural networks to generate a planned driving trajectory 172 that identifies a respective set of points that should be traversed by the vehicle 102. In particular, the planned driving trajectory 172 identifies, for each of multiple future times, a point that corresponds to a location in the environment at which the vehicle 102 should be located at the corresponding future time. This process is described in more detail below in reference to FIGS. 3-6.

The on-board system 100 can provide the planned driving trajectory 172 or a refined driving trajectory generated from the planned trajectory 172 by applying one or more other techniques, e.g., rule-based stabilization techniques or other machine learning models, to a control system for the vehicle, a user interface system 174, or both.

When the user interface system 174 receives a planned driving trajectory, the user interface system 174 can use the planned trajectory to present information to the driver of the agent 102 to assist the driver in operating the agent 102 safely. The user interface system 174 can present information to the driver of the agent 102 by any appropriate means, for example, by an audio message transmitted through a speaker system of the agent 102 or by alerts displayed on a visual display system in the agent (e.g., an LCD display on the dashboard of the agent 102). For example, the user interface system 174 can present a visualization of the future trajectory or of control inputs that would guide the vehicle along the planned future trajectory.

When the control system receives a planned trajectory, the control system then translates the trajectory to control inputs for the vehicle 102, i.e., steering and acceleration inputs, and then apply those inputs to cause the vehicle to travel along the trajectory.

When the control system controls the vehicle 102 using the planned trajectory, the user interface system 174 can also display data generated by the trajectory planning system 170 to an occupant of the vehicle in order to make the driving decisions made by the vehicle 102 more interpretable to the occupant. In particular, as will be described in more detail below, as part of generating any given planned trajectory, the system 170 generates attention weights for each of a plurality of different locations in the environment that indicate how much weight the system 170 assigned to the region when generating the trajectory. Because of an attentional bottleneck that is used by the system 170, the attention weights are generally sparse, i.e., assign high weights to only a small subset of the locations in the vicinity of the vehicle. The system can display a representation of the attention weights to the occupant of the vehicle 102, e.g., on a LCD or other display. For example, the visual representation can be a heatmap that assigns different colors to different weight ranges. Viewing the visual representation may allow the occupant to better understand which regions of the environment the system 170 focused on when generating the planned trajectory.

An example of such a visual representation is described below with reference to FIG. 4.

To generate the planned driving trajectory 172, the trajectory planning system 170 can use trained parameter values 135 for the one or more deep neural networks that it obtains from a model parameters store 130 in the training system 120.

The training system 120 is typically hosted within a data center 124, which can be a distributed computing system having hundreds or thousands of computers in one or more locations.

The training system 120 includes a training data store 180 that stores the training data used to train the parameter values of the trajectory planning system 170. The training data store 180 receives raw training examples from vehicles operating in the real world. For example the training data store 180 can receive a raw training example 175 from the vehicle 102 and one or more other agents that are in communication with the training system 120. The raw training example 175 can be processed by the training system 120 to generate a new training example. The raw training example 175 includes the input data 152 and the intended route data 154 that together can be used as the input for the new training example. The raw training example 175 also includes outcome data characterizing the actual trajectory traversed by the vehicle 102 over the same time period as the planned driving trajectory 172. This outcome data can be used to generate a ground-truth output for the new training example.

The training data store 180 provides training examples 185 to a training engine 190, also housed in the training system 120. The training engine uses the training examples 185 to update model parameters that will be used by the trajectory planning system 170, and provides the updated model parameters 195 to the model parameters store 130. Once the parameter values of the trajectory planning system 170 have been fully trained, the training system 120 can send the trained parameter values 135 to the trajectory planning system 170, e.g., through a wired or wireless connection.

FIG. 2 is a block diagram of an example data representation system 200 for generating input data 220. The data representation system 200 is an example of a system implemented as computer programs on one or more computers in one or more locations in which the systems, components, and techniques described below are implemented.

The data representation system 200 processes sensor data and intended path data to generate the input data 220.

The input data 220 is composed of multiple "channels". Each channel is a two-dimensional array of data values that represents a "top-down" perspective of the environment in the vicinity of the vehicle. Each position in each channel corresponds to a respective location in the environment and can be indexed by respective coordinates. Each of the channels have the same dimensionality (i.e., the same number of rows and columns), the same top-down perspective of the environment, and are aligned (i.e., registered) with one another. That is, positions which are indexed by the same coordinates in different channels correspond to the same location in the environment. In other words, corresponding positions in different channels correspond to the same location in the environment.

In the example of FIG. 2, the input data 220 includes one or more roadmap channels (a) that depicts a road map of the road being traversed by the vehicle and any other roads in the vicinity of the current location of the vehicle from the top-down perspective. More specifically, these channels represent a known geometry of the environment in the vicinity of the vehicle. For example, the roadmap channels can be a single channel, i.e., a single greyscale image that denotes the road geometry or can be three channels, i.e., an RGB image, that also represents the positions of different features of the environment, including: the road, different lanes in the road, crosswalks, traffic lights, construction zones, school zones, and the like, all of which are color-coded according to a predefined scheme.

The input data 220 also includes a speed limits channel (b) that visually depicts speed limits for different areas of the road, i.e., with different areas of the roads with different speed limits being shown in different colors, (c) a past agent poses channel that depicts past poses of the vehicle from the top-down perspective, i.e., that identifies previous points traversed by the vehicle, a current agent box channel (d) that identifies a current vehicle position from the top down perspective, and a route channel (e) that depicts the intended route of the vehicle starting from the current vehicle position from the top down perspective.

Figure 5:
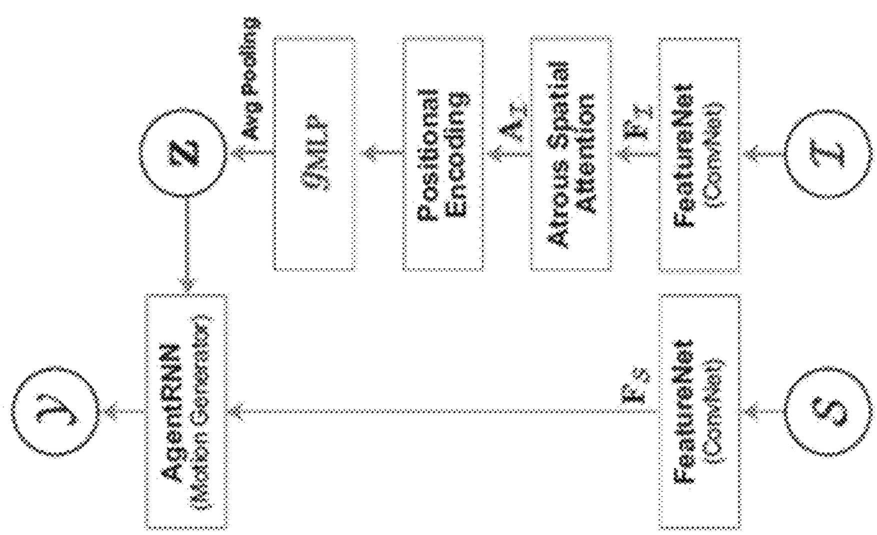
FIG. 5 is a diagram of generating a planned driving trajectory using an attentional bottleneck.

The input data 220 also includes one or more traffic lights channels (f) that depicts data characterizing a state of traffic lights in the vicinity of the vehicle and one or more dynamic objects channels (g) that depict data characterizing dynamic objects in the vicinity of the vehicle. In particular, each traffic lights channel (f) is a gray-scale image where each lane center is color coded to reflect different traffic light states (in particular, with red light: brightest gray level, green light: darkest gray level). Each dynamic objects channel (g) is a gray-scale image that renders all the potential dynamic objects (vehicles, cyclists, pedestrians) as oriented boxes. In the example of FIG. 5, both (f) and (g) are a sequence of 5 gray-scale images reflecting the environment state over the past 5 timesteps.

The data representation system 200 generates the input data 220 by aligning and channel-wise concatenating the generated channels, as depicted by 280 in FIG. 2 That is, the input data is generated by concatenating all generated channels. By implicitly representing the state of the environment in this format, the data representation system 200 can generate a representation which is both compact and can be effectively processed by the trajectory planning system.

In particular, as will be described below, the trajectory planning system includes one or more convolutional neural networks that encode the input data. Thus, the trajectory planning system can process the input data using convolutional neural network layers defined by multi-dimensional (e.g., two- or three-dimensional) convolutional filters, thereby enabling the system to learn complex spatial relationships between different spatial regions of the environment.

In some implementations, the input data/is divided into a subset of sparse data and a subset S of dense data. Dense data is data for which the planning system requires a dense, holistic representation in order to make effective driving decisions and is therefore harder to compress. In other words, the planning system will likely need to be provided with all of the context provided by a given channel of dense data rather than focusing on a subset of the channel for context in order to generate a high quality trajectory. Examples of dense data are shown in the top row of the input data 220: the roadmap channel(s) (a) and the speed limits channel (b). In particular, it is likely that an overall understanding of the entire roadmap in the vicinity of the vehicle will be required to make effective driving decisions. Similarly, an overall understanding of all of the speed limits of all stretches of road in the vicinity of the vehicle will likely be required to make effective driving decisions. In some cases, the past agent poses channel (c) and the current agent box (d) can also be viewed as dense data: all of the agent pose information, both current and past, will be highly relevant to making driving decisions.

Sparse data, on the other hand, is data for which the planning system can focus on a smaller portion of the representation while still making effective driving decisions. Examples of sparse data include the traffic light state channels (f), and the dynamic object channels (g). For example, to make immediate driving decisions, the planning system may be able to focus on specific objects and entities in the scene, i.e., proper subsets of the traffic lights and the dynamic objects, while placing less focus on objects and entities that will not be relevant to immediate driving decisions. As will be described below, in some cases, the system leverages this division of the input data 220 into sparse and dense data when generating the planned trajectory.

Figure 3:
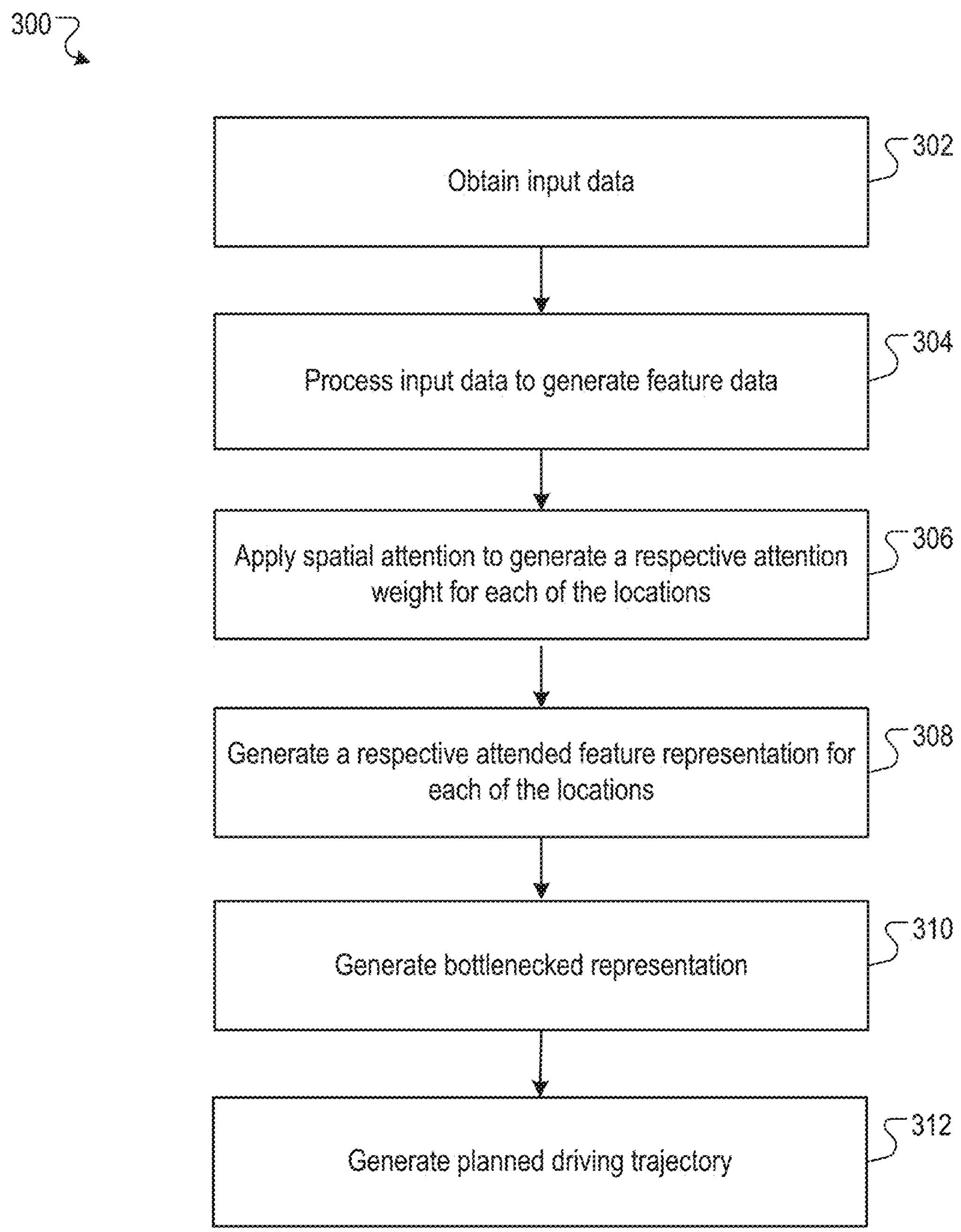
FIG. 3 is a flow diagram of an example process for generating a planned driving trajectory.

FIG. 3 is a flow diagram of an example process 300 for generating a planned driving trajectory for a vehicle. For convenience, the process 300 will be described as being performed by a system of one or more computers located in one or more locations. For example, an on-board system, e.g., the on-board system 110 of FIG. 1, appropriately programmed in accordance with this specification, can perform the process 300.

The system obtains input data (step 302). The input data includes an intended route for the vehicle and data characterizing the environment in the vicinity of the vehicle. As described above, in some implementations the input data is divided into sparse data and dense data.

The system processes the input data using an input encoder neural network to generate feature data (step 304). When the input data is divided into sparse data and dense data, the system processes both the sparse data and the dense data using the input encoder neural network. The feature data includes respective feature representations for each of a plurality of locations in the environment. As a particular example, when, as described above, the input data includes multiple channels of data all represented in a top-down representation, the plurality of locations in the environment can be different regions of the top-down representations, e.g., different pixels (or spatial coordinates) of the top-down representations. As will be described in more detail below, this feature data can also optionally include additional features, i.e., those generated from dynamic object information, in addition to the feature representation. These additional features can also additionally be used during training to generate an input to a perception neural network.

The system applies spatial attention to the feature representations to generate a respective attention weight for each of the plurality of locations (step 306).

Generally, the system can apply any appropriate spatial attention mechanism that is differentiable, i.e., that has parameters that can be learned jointly with the remainder of the parameters of the trajectory planning system, and that generates a respective weight for each of the plurality of locations by processing the feature representations.

As a particular example, the system can process the feature representations using an atrous spatial attention layer to generate the attention weights. An atrous spatial attention layer is one that applies one or more atrous convolutions to the feature representations as part of generating the attention weights. A so-called atrous convolution has an atrous rate that defines the spacing between elements in the kernel for the layer. In other words, the atrous rate defines how many values are skipped over in the input feature map to the atrous convolutional layer when applying the kernel of the convolutional layer. An atrous convolution with an atrous rate of a means that there are a-1 input values that are skipped when computing each linear combination between the kernel and the input feature map. In particular, at least one of the atrous convolutions applied by the atrous spatial attention layer have an atrous rate greater than one. A particular example of an atrous spatial attention layer is described in more detail below with reference to FIG. 6. Using atrous convolution can allow the system to consider local context when generating the attention weight for any given location rather than generating the attention weights for all locations independently of one another.

The system generates a respective attended feature representation for each of the plurality of locations by applying the attention weight for the location to the feature representation for the location (step 408). In other words, for each of the plurality of locations, the system multiplies the attention weight by the feature representation to generate an attended feature representation.

The system generates a bottlenecked representation of the attended feature representations (step 410). The bottlenecked representation is referred to as "bottlenecked" representation because the bottlenecked representation has a lower dimensionality than the feature data, limiting (or "bottlenecking") the amount of information from the feature data that can be used to generate the planned driving trajectory. For example, instead of an h×w×d feature map, the bottlenecked representation can be a single, d dimensional vector. In particular, because the bottleneck enforces an information loss through the dimensionality reduction, the spatial attention neural network learns to attend to the most relevant parts of the feature representations (and to generate feature representations that convey the most relevant features of each of the locations).

The system generates the planned driving trajectory from at least the bottlenecked representations using a motion neural network (step 412). In particular, in implementations where the input data is divided into dense and sparse data, the system also uses feature representations (that have not been bottlenecked) generated only from the dense data in generating the planned driving trajectory. In other words, in these implementations, the system generates the planned driving trajectory using (i) bottlenecked feature representations generated from both dense and sparse data and (ii) unbottlenecked dense input feature representations generated only from the dense data to generate the planned driving trajectory. By including features of the dense portion of the input data in the motion input, the system gives the motion network direct access to features of a subset of dense inputs (e.g., road lane geometry and connectivity information) that are harder to compress. This frees up the bottleneck branch to focus on selecting the most relevant parts of the dynamic input (e.g., nearby objects), while retaining the model performance.

Figure 4:
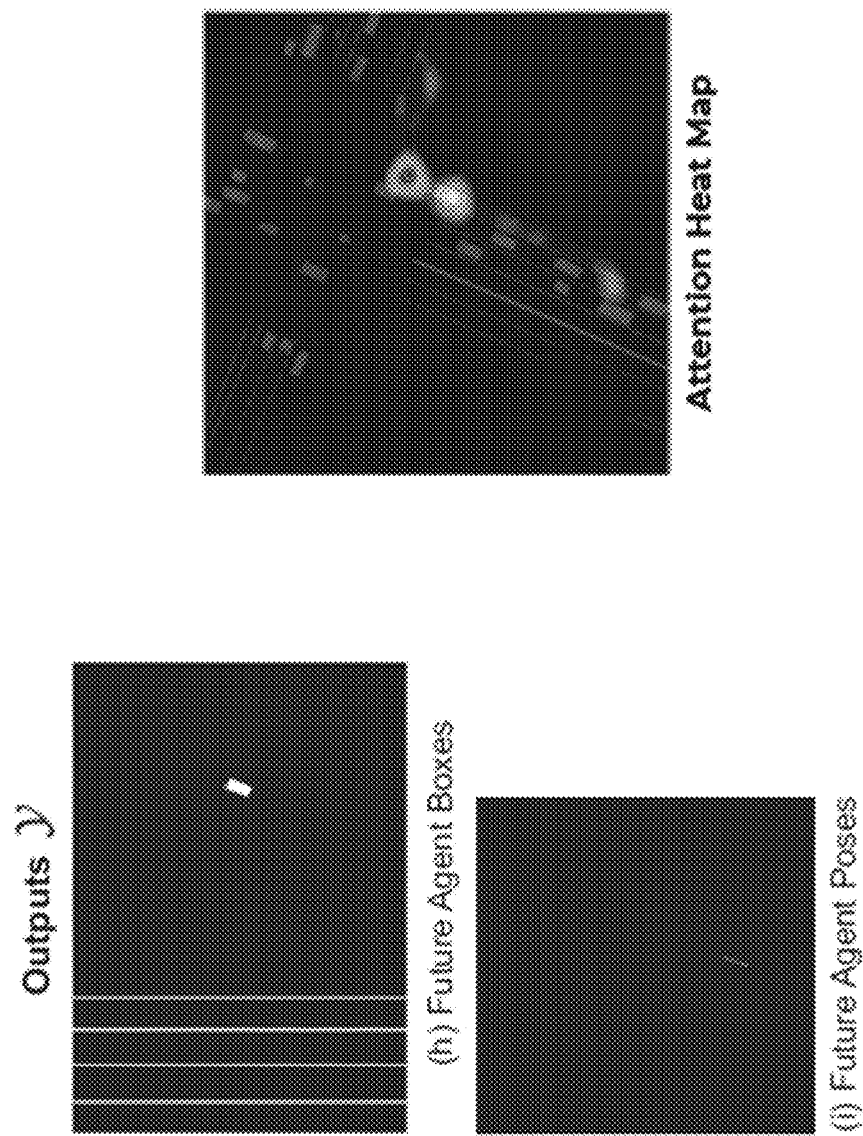
FIG. 4 shows example outputs of the trajectory planning system.

FIG. 4 shows an example output generated by the trajectory planning system. As shown in FIG. 4, the planned driving trajectory is defined by a series of future agent poses (i), i.e., each corresponding to a different time along the future trajectory. Each future agent pose is generated in the same top-down representation as the input data. Optionally, the trajectory planning system can also generate as part of the planned driving trajectory a series of future agent boxes (h) that include a separate bounding box for each of the times along the future trajectory. The bounding boxes indicate a planned heading and location of the vehicle at the corresponding time.

As can be seen from the example of FIG. 4, the system can also provide a visual representation of the attention weights for presentation to a user, i.e., an operator of the vehicle, to give the user insight into how the system generated the planned future trajectory. As shown in FIG. 4, the visual representation depicts the attention weights as an attention heat map overlaid over a representation of the environment from the top-down perspective, i.e., a representation that represents the road graph, the vehicle, and dynamic and static objects in the environment. In the attention heat map, the brighter regions reflect areas salient for the task, i.e., locations with high attention weights. As can be seen from FIG. 4, the attention heat map is sparse and salient, allowing for excellent interpretability of the reason for the model's predictions. This sparse and salient nature of the heat map is achieved because of attaching attention to a bottlenecked latent representation of the input data.

FIG. 5 is a diagram 500 of generating a planned driving trajectory using dense and sparse data.

As shown in FIG. 5, the input data I includes a subset S that includes only the dense data (and not the sparse data) from the input data I.

The system processes the dense data S using a dense input encoder neural network to generate dense input feature representations $F_s$, that include a respective dense input feature representation for each of the plurality of locations in the environment. Like the input encoder neural network, the dense input encoder neural network is a convolutional neural network that maps the dense data S to a feature map $F_s$, that has a respective feature vector for each of the plurality of locations. As a particular example, the input encoder neural network and the dense input encoder neural network can have identical network architectures but different parameter values as a result of the joint training of the two neural networks.

As described above, the system processes the input data I that includes the dense data S and the sparse data using the input encoder neural network to generate input feature representations $F_I$ that include a respective input feature representation for each of the plurality of locations in the environment.

The system then applies atrous spatial attention to the input feature representations $F_I$ to generate attended feature representations $A_I$ that include a respective attended feature representation for each of the plurality of locations. In particular, the system processes the input feature representations $F_I$ using an atrous spatial attention layer to generate a respective attention weight for each location and then, for each location, applies the attention weight for the location to the feature representation for the location to generate the respective attended feature representation for the location.

The system then generates the bottlenecked representation z from the attended feature representations $A_I$.

In the example of FIG. 5, the system first applies a positional encoding to the attended feature representations $A_I$ by concatenating the feature representation for the location with a positional encoding for the location to generate a respective position-dependent representation for each location. That is, the system maintains a respective positional encoding vector for each of the locations and, for each location, concatenates the feature representation for the location with the positional encoding vector for the location to generate the position-dependent representation for the location.

The system then processes the position-dependent representations using a feedforward neural network that is configured to map the position-dependent representations to a lower-dimensional latent space to generate the bottlenecked representation.

The feedforward neural network includes a multi-layer perceptron $g_{MLP}$ that operates on each of the position-dependent representations independently to generate a respective latent representation that has the same dimensionality as the bottlenecked representation z of each position-dependent representation and then a pooling operation, e.g., average pooling, max pooling, min pooling, or a summation operation, that pools the latent representations to generate the bottlenecked representation z.

The system then uses the bottlenecked representation z and the dense feature representations Fs to generate the planned driving trajectory using a motion generator neural network.

As one example, the motion generator neural network can be a feedforward neural network that generates all of the points along the planned driving trajectory in one pass conditioned on a motion input that includes the bottlenecked representation z and the dense feature representations Fs. For example, the motion generator neural network can regress the locations of the points in the same coordinate system as the input data conditioned on the motion input. As a particular example, the motion input can be a feature map that concatenates the bottlenecked representation to each dense feature representation.

As another example, the motion generator neural network can be an auto-regressive neural network that generates the planned driving trajectory over multiple planning iterations by generating a set of points at each of the planning iterations, with each point corresponding to a different time in the trajectory.

In this example, at each planning iteration, the system processes a motion input for the planning iteration that includes the bottlenecked representation and the dense feature representations Fs using the motion generator neural network to generate a motion output that characterizes a next set of one or more points on the driving trajectory for the vehicle. The motion input for any given planning iteration can also identify the points that have already been added to the driving trajectory at previous iterations. For example, the motion output at each planning iteration can be a heatmap that defines, for each of the locations in the environment, a probability that the agent will be located at the location at the corresponding time in the planned trajectory and the system can select the highest probability location in the heatmap as the point in the planned trajectory at the corresponding time. Optionally, the system can further refine this highest probability location to allow the location to be more granular than the input representation to the network.

In some cases, the motion output also includes a predicted future agent bounding box of the vehicle at each of the times in the planned future trajectory. In particular, the system can generate a bounding box heat map that assigns a respective probability between zero and one to each location in the input representation that represents the likelihood that the location will be part of the agent at the corresponding future time. In these cases, when the motion neural network generates the future trajectory over multiple planning iterations, the motion input at each iteration can include data identifying the predicted future agent bounding box of the vehicle, i.e., the bounding box heat map, generated at one or more of the preceding planning iterations.

An example of such a neural network that generates motion outputs over multiple planning iterations is described in Bansal, et al, ChauffeurNet: Learning to Drive by Imitating the Best and Synthesizing the Worst, arXiv: 1812.03079 published in RSS 2019.

As described above, in some implementations, the input data includes data characterizing dynamic objects in the vicinity of the vehicle. In some of these implementations, the system can also generate, from the data characterizing dynamic objects in the vicinity of the vehicle, a respective dynamic object feature representation for each of the locations in the environment. The system can then include these dynamic object feature representations along with the feature representations in the feature data, i.e., so that the feature data is a combination, e.g., a concatenation, of, for each location, the feature representation for the location and the dynamic object feature representation for the location. The system can generate these dynamic object feature representations using either the approach described above for generating the feature representations for the dense data or the approach described above for generating the attended feature representation for the input data.

During training, the system can use the dynamic object feature representations to compute an auxiliary objective that improves the training of the trajectory planning system. In particular, the system can process a dynamic input comprising the dynamic object feature representation using a perception neural network to generate a prediction characterizing the future positions of the dynamic objects and then use errors in the prediction as an auxiliary objective that is optimized jointly with the main objective used to train the trajectory planning system, i.e., by causing the trajectory planning system to generate more informative dynamic object feature representations.

Generally, however, the parameters of the trajectory planning system, i.e., the parameters of the motion neural network, the encoder neural network(s), the attention mechanism(s), and so on, are learned end-to-end to (i) minimize errors between planned trajectories generated by the trajectory planning system and ground truth trajectories for training examples and (ii), optimize one or more auxiliary objectives that rely on portions of the motion output or as described above on auxiliary outputs generated by the system. Techniques for training the trajectory planning system end-to-end are described in Bansal, et al, ChauffeurNet: Learning to Drive by Imitating the Best and Synthesizing the Worst, arXiv:1812.03079, the entire contents of which are hereby incorporated by reference herein in their entirety.

Figure 6:
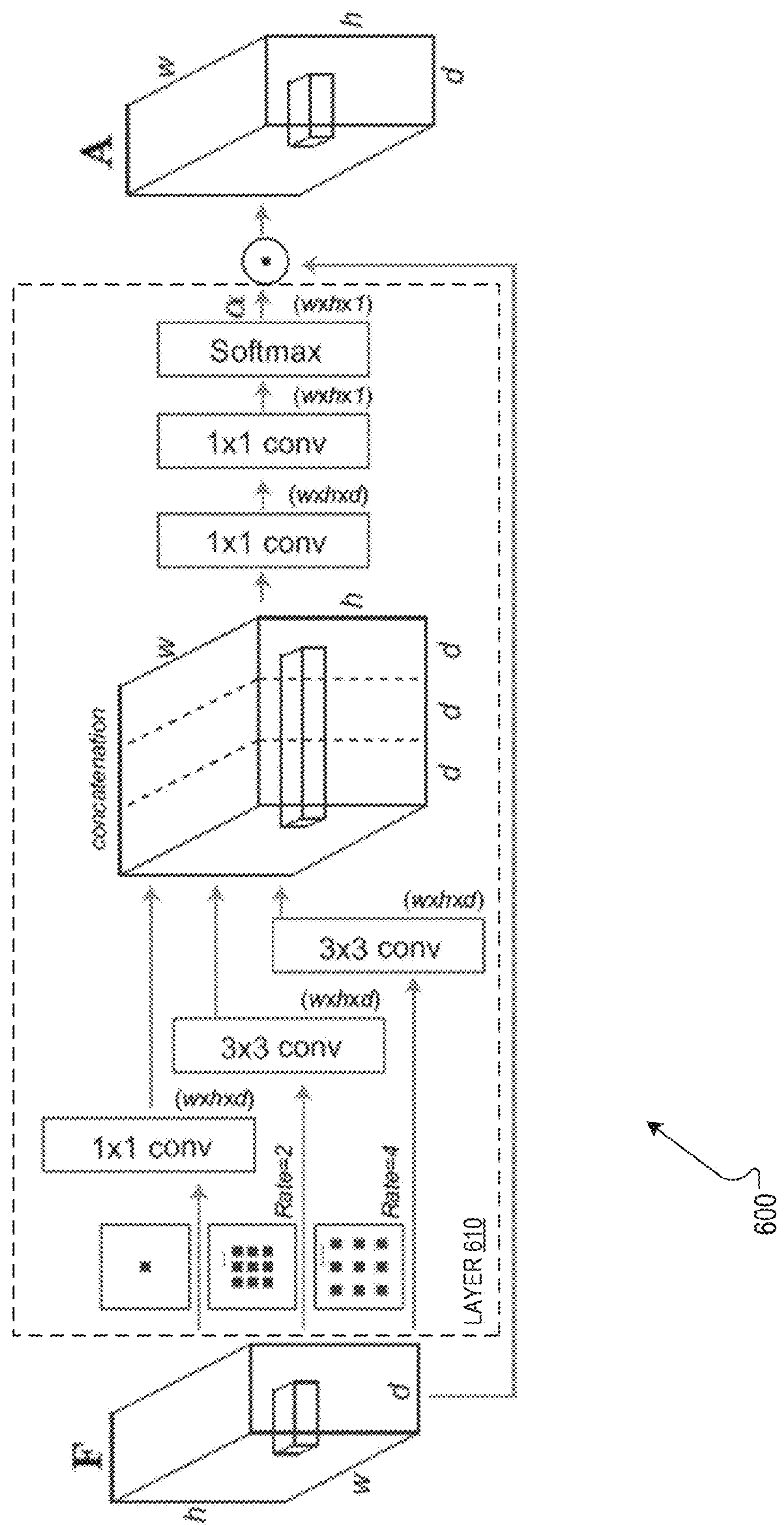
FIG. 6 is a diagram showing a spatial attention mechanism that uses atrous convolutions.

FIG. 6 is a diagram 600 that shows an example spatial attention mechanism that uses atrous convolutions. As described above, the attention mechanism receives an input feature map F that includes the input feature representations $F_I$ for the plurality of locations and generates as output an attended feature map A that includes the attended feature representations $A_I$ for each of the plurality of locations.

In the example of FIG. 6, there are h×w locations and the input feature representations and attended feature representations are d dimensional vectors.

As shown in FIG. 6, the attention mechanism processes the feature representations using an atrous spatial attention layer 610 to generate the attention weights. The system then multiplies each feature representation in the feature map F by the corresponding attention weight to generate the attended feature map A.

The atrous spatial attention layer 610 is configured to apply a plurality of different atrous convolutions to the feature map F to generate a plurality of convolved feature maps. That is, each different atrous convolution has a different atrous rate and the layer 610 applies each atrous convolution to generate a respective convolved feature map.

In the example of FIG. 6, the layer 610 applies three different convolutions: a 1×1 convolution, a 3×3 atrous convolution with an atrous rate of 2, and a 3×3 atrous convolution with an atrous rate of 4 to generate three different convolved feature maps.

The atrous spatial attention layer 610 then combines the convolved feature maps to generate a combined convolved feature map, e.g., by concatenating the convolved feature maps along the depth dimension.

The atrous spatial attention layer 610 then generates the attention weights from the combined convolved feature map. As shown in the example of FIG. 6, the layer 610 generates the attention weights from the convolved feature map by processing the convolved feature map using two 1×1 convolutional layers to generate a respective logit for each of the w×h locations and then a softmax layer to map the logits to the attention weights. As described above, the system can optionally provide a visual representation of the attention weights generated by the layer 610 for presentation to a user, e.g., an operator or passenger in the autonomous vehicle.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

The invention claimed is:

1. A method comprising:

obtaining input data comprising an intended route for a vehicle and data characterizing an environment in a vicinity of the vehicle, wherein the data characterizing the environment comprises dense data characterizing the environment and sparse data characterizing the environment;

processing the input data including the intended route, the dense data, and the sparse data using an input encoder neural network to generate feature data that includes a respective feature representation for each of a plurality of locations in the environment;

applying spatial attention to the feature representations to generate a respective attention weight for each of the plurality of locations;

generating a respective attended feature representation for each of the plurality of locations by applying the attention weight for the location to the feature representation for the location;

generating a bottlenecked representation of the attended feature representations that has a lower dimensionality than the feature data;

generating an unbottlenecked dense feature representation by processing only the dense data using a dense encoder neural network, wherein the sparse data comprises data characterizing dynamic objects in the vicinity of the vehicle and the dense data includes a roadmap of a road being traversed by the vehicle; and processing, using a motion generator neural network, a motion input that includes (i) the bottlenecked representation generated from the intended route, the dense data that includes the roadmap, and the sparse data that includes the data characterizing the dynamic objects, and (ii) the unbottlenecked dense feature representation generated from only the dense data that includes the roadmap, to generate a planned future trajectory defined by a sequence of poses of the vehicle with each pose corresponding to a different future time.

2. The method of claim 1, wherein the dense data further includes one or more of: speed limits for different areas of the road, past poses of the vehicle, or a current vehicle position.

3. The method of claim 1, wherein the sparse data further includes data characterizing a state of traffic lights in the vicinity of the vehicle.

4. The method of claim 1, wherein applying spatial attention to the feature representations to generate the respective attention weight for each of the plurality of locations comprises:

processing the feature representations using an atrous spatial attention layer to generate the attention weights.

5. The method of claim 4, wherein the atrous spatial attention layer is configured to:

apply a plurality of different atrous convolutions to a feature map of the feature representations to generate a plurality of convolved feature maps, wherein each of the plurality of different atrous convolutions has a different atrous rate;

combine the convolved feature maps to generate a combined convolved feature map; and generate the attention weights from the combined convolved feature map.

6. The method of claim 1, wherein generating the bottlenecked representation of the attended feature representations that has a lower dimensionality than the feature data comprises:

generating a respective position-dependent representation for each of the plurality of locations by concatenating the feature representation for the location with a positional encoding for the location; and processing the position-dependent representations using a feedforward neural network that is configured to map the position-dependent representations to a lower-dimensional latent space to generate the bottlenecked representation.

7. The method of claim 1, further comprising:

providing a visual representation of the attention weights for presentation to a user.

8. The method of claim 1, wherein processing, using the motion generator neural network, the motion input that includes (i) the bottlenecked representation generated from the intended route, the dense data, and the sparse data, and (ii) the unbottlenecked dense feature representation generated from only the dense data to generate the planned future trajectory comprises:

at each of a plurality of planning iterations:

processing the motion input for the planning iteration using the motion generator neural network to generate a motion output that characterizes a next point on the planned future trajectory.

9. The method of claim 8, wherein for each of the plurality of planning iterations other than the first planning iteration, the motion input for the planning iteration further comprises:

data identifying points on the planned future trajectory generated by the motion generator neural network at previous planning iterations.

10. The method of claim 8, wherein the motion output further comprises data identifying a predicted future pose of the vehicle, and wherein the motion input further comprises the data identifying the predicted future pose of the vehicle generated at a preceding planning iteration.

11. The method of claim 1, wherein the method further comprises:

generating, from the data characterizing the dynamic objects in the vicinity of the vehicle, a respective dynamic object feature representation for each of the plurality of locations in the environment, and wherein the feature data includes the feature representations and the dynamic object feature representations.

12. The method of claim 11, wherein the feature data includes, for each of the plurality of locations, a concatenation of the feature representation of the location and the dynamic object feature representation.

13. The method of claim 11, further comprising:

at each of a plurality of planning iterations, processing a dynamic input comprising the dynamic object feature representation using a perception neural network to generate a prediction characterizing future positions of the dynamic objects.

14. One or more non-transitory computer-readable storage media storing instructions that when executed by one or more computers cause the one or more computers to perform operations comprising:

obtaining input data comprising an intended route for a vehicle and data characterizing an environment in a vicinity of the vehicle, wherein the data characterizing the environment comprises dense data characterizing the environment and sparse data characterizing the environment;

processing the input data including the intended route, the dense data, and the sparse data using an input encoder neural network to generate feature data that includes a respective feature representation for each of a plurality of locations in the environment;

applying spatial attention to the feature representations to generate a respective attention weight for each of the plurality of locations;

generating a respective attended feature representation for each of the plurality of locations by applying the attention weight for the location to the feature representation for the location;

generating a bottlenecked representation of the attended feature representations that has a lower dimensionality than the feature data;

generating an unbottlenecked dense feature representation by processing only the dense data using a dense encoder neural network, wherein the sparse data comprises data characterizing dynamic objects in the vicinity of the vehicle and the dense data includes a roadmap of a road being traversed by the vehicle; and processing, using a motion generator neural network, a motion input that includes (i) the bottlenecked representation generated from the intended route, the dense data that includes the roadmap, and the sparse data that includes the data characterizing the dynamic objects, and (ii) the unbottlenecked dense feature representation generated from only the dense data that includes the roadmap, to generate a planned future trajectory defined by a sequence of poses of the vehicle with each pose corresponding to a different future time.

15. A system comprising one or more computers and one or more storage devices storing instructions that when executed by the one or more computers cause the one or more computers to perform operations comprising:

obtaining input data comprising an intended route for a vehicle and data characterizing an environment in a vicinity of the vehicle, wherein the data characterizing the environment comprises dense data characterizing the environment and sparse data characterizing the environment;

processing the input data including the intended route, the dense data, and the sparse data using an input encoder neural network to generate feature data that includes a respective feature representation for each of a plurality of locations in the environment;

applying spatial attention to the feature representations to generate a respective attention weight for each of the plurality of locations;

generating a respective attended feature representation for each of the plurality of locations by applying the attention weight for the location to the feature representation for the location;

generating a bottlenecked representation of the attended feature representations that has a lower dimensionality than the feature data;

generating an unbottlenecked dense feature representation by processing only the dense data using a dense encoder neural network, wherein the sparse data comprises data characterizing dynamic objects in the vicinity of the vehicle and the dense data includes a roadmap of a road being traversed by the vehicle; and processing, using a motion generator neural network, a motion input that includes (i) the bottlenecked representation generated from the intended route, the dense data that includes the roadmap, and the sparse data that includes the data characterizing the dynamic objects, and (ii) the unbottlenecked dense feature representation generated from only the dense data that includes the roadmap, to generate a planned future trajectory defined by a sequence of poses of the vehicle with each pose corresponding to a different future time.

16. The system of claim 15, wherein applying spatial attention to the feature representations to generate the respective attention weight for each of the plurality of locations comprises:

processing the feature representations using an atrous spatial attention layer to generate the attention weights.

17. The system of claim 15, the operations further comprising:

providing a visual representation of the attention weights for presentation to a user.

* * * * *